US00RE41073E

(19) United States
(12) Reissued Patent
Wobben

(10) Patent Number: US RE41,073 E
(45) Date of Reissued Patent: Jan. 12, 2010

(54) WIND POWER PLANT WITH A TRANSFORMER FIXED TO THE TOWER

(76) Inventor: Aloys Wobben, Argestrasse 19, D-266067 Aurich (DE)

(21) Appl. No.: 10/829,481

(22) PCT Filed: Apr. 13, 1999

(86) PCT No.: PCT/EP99/02461

§ 371 (c)(1),
(2), (4) Date: Nov. 22, 2000

(87) PCT Pub. No.: WO99/53199

PCT Pub. Date: Oct. 21, 1999

Related U.S. Patent Documents

Reissue of:
(64) Patent No.: 6,400,039
Issued: Jun. 4, 2002
Appl. No.: 09/647,857
Filed: Nov. 22, 2000

(51) Int. Cl.
*F03D 11/00* (2006.01)

(52) U.S. Cl. ..... 290/44; 290/55
(58) Field of Classification Search ..... 290/43, 290/44, 54, 55
See application file for complete search history.

(56) References Cited

U.S. PATENT DOCUMENTS

| | | | | | |
|---|---|---|---|---|---|
| 4,025,824 | A | * | 5/1977 | Cheatham | 361/601 |
| 4,095,120 | A | * | 6/1978 | Moran et al. | 290/44 |
| 4,217,501 | A | * | 8/1980 | Allison | 290/55 |
| 4,242,628 | A | * | 12/1980 | Mohan et al. | 322/35 |
| 4,291,233 | A | * | 9/1981 | Kirschbaum | 290/1 C |
| 4,357,542 | A | * | 11/1982 | Kirschbaum | 290/44 |
| 4,565,929 | A | * | 1/1986 | Baskin et al. | 290/44 |
| 4,815,936 | A | * | 3/1989 | Stoltze et al. | 416/9 |
| 5,244,569 | A | * | 9/1993 | Di Amico | 210/163 |
| 5,254,876 | A | * | 10/1993 | Hickey | 290/55 |
| 5,315,159 | A | * | 5/1994 | Gribnau | 290/55 |
| 5,798,632 | A | * | 8/1998 | Muljadi | 322/29 |
| 6,157,088 | A | * | 12/2000 | Bendix | 290/55 |
| 6,400,039 | B1 | * | 6/2002 | Wobben | 290/44 |
| 6,425,708 | B1 | * | 7/2002 | Siegfriedsen | 405/154.1 |
| 2001/0002757 | A1 | * | 6/2001 | Honda et al. | 290/55 |

FOREIGN PATENT DOCUMENTS

| | | | |
|---|---|---|---|
| DE | 44-36-197 | * | 4/1996 |
| DE | 19615795 | A1 | 10/1997 |
| JP | 07-122438 | * | 5/1995 |

OTHER PUBLICATIONS

"A Study of Offshore Based Wind Power: The Blekinge Project (Sweeden)" Summary Report, The Blekinge Project Organization, pp. 1–11 May 1991.
"Kurze Einführung in die Windenergietechnologie" Deutsches Windenergie–Institut GmbH publication, Jan. 31, 1993.
"Vestas V66–1.65 MW Pitch–Geregelte Windenergieanglage mit OptiSlip® und OptiTip®" Vestas product brochure, Dec. 1998.
Björk, B., "A Feasibility Study on Offshore Wind Turbine Systems," *Wind Engineering*9(4): 243–255, 1985.
Hau, E. et al (eds.), "WEGA II. Large wind turbines," European Commission Report EUR 16902 EN, 1996, p. 47.

(Continued)

*Primary Examiner*—Nicholas Ponomarenko
(74) *Attorney, Agent, or Firm*—Seed IP Law Group PLLC

(57) ABSTRACT

The invention concerns a wind power installation comprising a pylon, a foundation for the pylon and an energy transfer unit for transfer of the current generated to the power network. The wind power installation according to the invention is distinguished in that the weight of the energy transfer unit is carried by the foundation of the pylon of the wind power installation.

13 Claims, 1 Drawing Sheet

OTHER PUBLICATIONS

Hoericht, R., "Wind power electricity generation 250 kW power plant e.g. for installing over roads or railways—has multiple wind powered rotors mounted on support structure spanning road or railway track with sufficient free space left for road—railway vehicles to pas underneath safety," Derwent Index Abstract Accession No. . 1997–505515, 1997. See also DE 19615795A1.

Olsen and Dyre, "Videby Off–Shore Wind Farm—Construction and Operation," *Wind Engineering* 17(3): 120–128, 1993.

Spera, D. (ed.), Wind Turbine Technology: Fundamental Concepts of Wind Turbine Engineering, ASME Press, New York, 1994, pp. 50, 56, 61.

Stiedal, H. et al., "The Worlds's First Offshore Wind Farm—A Manufacturer's Experience," in Owemes '97 European Seminar, La Maddalena, Italy, Apr. 10–11, 1997.

Van de Sande, A.M.C., "Windfarm 'Lely'—First Off–Shore Project in the Netherland," in Owemes '97 European Seminar, La Maddalena, Italy, Apr. 10–11, 1997.

* cited by examiner

"AMENDED"
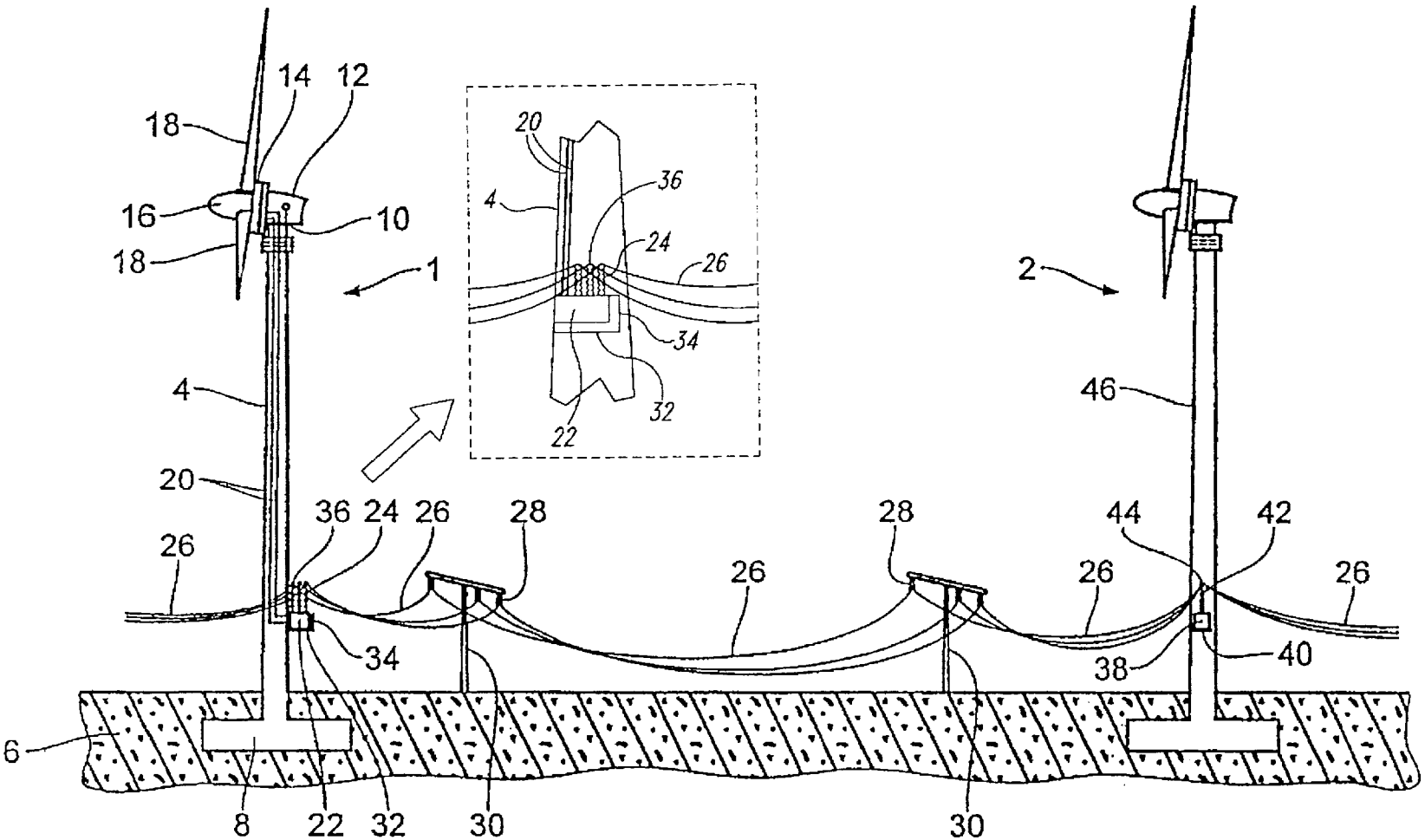

WIND POWER PLANT WITH A TRANSFORMER FIXED TO THE TOWER

Matter enclosed in heavy brackets [ ] appears in the original patent but forms no part of this reissue specification; matter printed in italics indicates the additions made by reissue.

The invention concerns a wind power installation comprising a pylon, a foundation for the pylon and an energy transfer unit for transfer of the current generated to the power network.

Wind power installations of that kind are well-known from the state of the art. By means of installations of that kind, the energy stored in the wind is converted into electrical energy by way of a rotor which rotates in the wind and a generator which is driven by the rotor. In order to be arranged at a height of optimum wind speed, the rotor is generally disposed at the tip of a tower or pylon. By virtue of the not inconsiderable weight of the installation overall and the loadings involved with high wind speeds, the entire installation must be anchored in the ground by means of a foundation.

It is also known that the current generated by the wind power installation is passed by way of a line laid in the ground to an energy transfer unit for transfer of the current generated to the power network. That energy transfer unit which usually includes a transformer is in that case disposed at some distance from the pylon and by virtue of its also not inconsiderable weight is usually anchored to the ground by a foundation.

A disadvantage with wind power installations of that kind which are known from the state of the art however is that they are relatively inflexible in terms of erection thereof. For often installations of that kind are used in regions in which for example due to the ground consisting of rock, it is only possible at extremely high cost and complication to drive a foundation into the ground. In the state of the art therefore installing the energy transfer units at a spaced position from the pylon of the wind power installation often gives rise to serious difficulties and thus involves increased costs in terms of emplacement and erection.

A further disadvantage with the known wind power installations as set forth in hereinbefore is that the energy transfer units are accessible to anyone by virtue of their position on the ground and can thus be the victim of sabotage. In order to prevent such sabotage by unauthorised parties, it is admittedly known for the energy transfer units of wind power installations of that kind to be provided with suitably secured openings or fencing enclosures but this is also disadvantageous in consideration of the additional costs involved.

Therefore the object of the invention is to avoid the above-mentioned disadvantages of the state of the art and to provide a wind power installation of the kind set forth in the opening part of this specification, which can be set up even in inhospitable areas and which effectively makes sabotage by unauthorised parties more difficult.

In accordance with the invention, in a wind power installation of the kind set forth in the opening part of this specification, that object is attained in that the weight of the energy transfer unit is carried by the foundation of the pylon.

The advantages of the invention are in particular that there is no need for an additional foundation for the energy transfer unit to be provided in the ground. The invention provides that the foundation for the pylon, which is usually of a very stable nature in any case by virtue of the demands referred to in the opening part of this specification, is also used for supporting the weight of the energy transfer unit. The invention therefore completely saves on the costs of an additional foundation.

It is particularly advantageous in the case of the wind power installation according to the invention that safeguarding the pylon against access by unauthorised parties simultaneously prevents unauthorised parties having access to the energy transfer unit. Thus for example an enclosure for the pylon which is already present means that an energy transfer unit which is mounted directly to the pylon on the foundation of the pylon can also be safeguarded against unauthorised parties by the fencing enclosure. In addition for example a pylon which is hollow in its interior can accommodate the energy transfer unit in its interior so that the energy transfer unit, even without an enclosure around the pylon, is safeguarded against sabotage by unauthorised parties. In the case of the last-mentioned embodiment it is moreover particularly advantageous that the power lines from the pylon to the energy transfer unit can be kept very short as by virtue of its position in the interior of the pylon, the energy transfer unit is in the closest possible proximity to the power cables which extend in the interior of the pylon and which run from the current generator to the energy transfer unit. Moreover, in this embodiment, the energy transfer unit is completely protected from the weather by virtue of its being positioned in the interior of the pylon. By virtue thereof, particularly in areas involving aggressive and corrosive weather conditions, for example in the proximity of the sea with correspondingly salt-laden air, it is possible very substantially to forego a particularly expensive sealing arrangement or expensive anti-corrosion measures for the energy transfer unit.

A further, particularly advantageous embodiment of the invention is distinguished in that the energy transfer unit is fixed externally to the pylon. In this embodiment the energy transfer unit is admittedly not weather-proofed as in the case of the above-mentioned embodiment; it is however advantageously exposed to the cooling wind so that for example it is possible to eliminate cooling for a transformer of the energy transfer unit, as is possibly necessary in particular in hot areas. In addition, in this embodiment possible malfunctions of the energy transfer unit which for example could cause a fire do not spread directly to the overall installation.

A particularly preferred embodiment is one in which the energy transfer unit is disposed approximately at the height of an overland power line of the power network, to which the wind power installation is connected. This embodiment therefore provides that the power is transferred directly to the overland power line directly at the height thereof so that there is no need for any additional lines from the energy transfer unit to the not inconsiderable height of conventional overland power lines.

In this embodiment moreover the overland power lines also do not have to be taken down to the proximity of the ground so that this embodiment is also distinguished by enjoying an increased level of safeguard against sabotage.

Further advantageous embodiments of the invention are set forth in the appended claims.

An embodiment of the invention will now be described with reference to the accompanying drawing.

The single FIGURE of the drawing diagrammatically shows the wind power installation according to the invention.

The FIGURE shows in its left-hand part a partly sectional wind power installation 1. The FIGURE shows in its right-hand part a wind power installation 2. The FIGURE shows the wind power installation 1 partly in section as viewed from the side. The wind power installation 2 is also shown as a side view, but not in section. The wind power installations 1 and 2 are identical in terms of their structure so that here only the wind power installation 1 which is shown at the left will be described in respect of its structure.

The wind power installation 1 has a tower or pylon 4 which is arranged perpendicularly relative to the ground 6. The pylon 4 of the wind power installation 1 is anchored in the ground 6 by a foundation 8. The foundation 8 is of an enlarged diameter, in relation to the diameter of the pylon 4.

A machine housing 12 is mounted to the tip 10 of the pylon 4. Ancillary assemblies (not shown) of the wind power installation 1 are disposed in the machine housing 12. A generator 14 is disposed directly adjoining the machine housing 12. The generator 14 converts the rotational energy of the rotor hub 16 connected thereto into electrical energy. The rotor hub 16 is caused to rotate by rotor blades 18 which rotate in the wind by virtue of an aerofoil profile.

The electrical energy produced is made available by the generator 14 by way of lines 20 to a transformer 22 which operates as an energy transfer unit. The transformer 22 feeds the transformed electrical energy by way of circuit breakers 24 into overland power lines 26. The overland power [lands] *lines* 26 are suspended on masts 30 by way of insulators 28.

The transformer 22 is arranged directly at the pylon 4. The transformer 22 is disposed on a platform 32. At its end remote from the pylon the [transformer] *platform* 32 has a limiting wall 34. The platform 32 is disposed substantially at the height of the overland power lines 26 so that the fixing points 36 which serve above the circuit breakers 24 for fixing the overland power line 26 above the transformer 22 to the pylon 4 are disposed substantially at the same height as the insulators 28. In the illustrated embodiment therefore the pylon 4 also performs the function of a mast 30.

*The previously described alternative embodiment, where the energy transfer unit is positioned internally in a pylon is shown by the arrow to the broken line box in the FIGURE. As shown inside the broken line box, the pylon 4 is hollow in its interior such that the transformer 22 is inside of and fixed internally to the pylon 4 by the platform 32.*

The right-hand half of the FIGURE shows a wind power installation 2 which is of the same structure as the wind power installation 1. In the illustrated view however the transformer 38 is mounted turned through 90° on the side of the wind power installation 2, which is towards the person viewing the drawing. In addition the FIGURE does not show a limiting wall for the platform 40 of the wind power installation, such wall corresponding to the limiting wall 34 of the platform 32. The transformer 38 however is also connected by way of circuit breakers 42 to overland power lines 26 fixed to the pylon 46 at fixing points 44.

What is claimed is:

[1. A wind power installation comprising:

a generator attached to a pylon;

the pylon supported by a foundation;

an energy transfer unit for transfer of the current generated by the generator to a power network, wherein the weight of the energy transfer unit is supported by the foundation.]

2. The wind power installation in claim [1] *6*, wherein the energy transfer unit is a transformer.

3. The wind power installation in claims [1] *6* or 2, wherein the energy transfer unit is fixed externally to the pylon.

4. The wind power installation in claims [1] *6* or 2, wherein the energy transfer unit is fixed internally to the pylon.

[5. The wind power installation in claims 1 or 2, further comprising:

the energy transfer unit is arranged on a platform which is fixed to the pylon.]

6. [The wind power installation in claims 1 or 2,] *A wind power installation, comprising:*

*a generator attached to a pylon;*

*the pylon supported by a foundation;*

*a platform fixed to the pylon; and*

*an energy transfer unit arranged on the platform for transfer of current generated by the generator to a power network,*

*wherein weight of the energy transfer unit is supported only by the foundation,* wherein[:] the power network has overland power lines, and

*wherein* the energy transfer unit is arranged substantially at [the] *a* height of the overland power lines *and provides for power line support.*

*7. A wind power installation, comprising:*

*a generator attached to a pylon;*

*the pylon supported by a foundation;*

*an energy transfer unit for transfer of current generated by the generator to a power network, wherein weight of the energy transfer unit is supported only by the foundation and the energy transfer unit is fixed externally to the pylon, wherein:*

*the power network has overland power lines, and*

*the energy transfer unit is arranged substantially at a height of the overland power lines and provides for power line support.*

*8. The wind power installation according to claim 9, wherein the energy transfer unit is a transformer.*

*9. A wind power installation, comprising:*

*a pylon;*

*an electric generator attached to said pylon;*

*a foundation coupled to and supporting said pylon;*

*a platform coupled to and supported solely by said pylon; and*

*an energy transfer unit affixed to and supported by the platform, an entire weight of the energy transfer unit being supported by said pylon, wherein the platform is coupled to the pylon at a height which is approximately equal to a height of overland power lines adjacent to the pylon, and wherein the energy transfer unit provides for power line support.*

*10. The wind power installation according to claim 9, wherein the platform includes a limiting wall adjacent to a sidewall of the energy transfer unit.*

*11. The wind power installation according to claim 10 wherein the platform includes a base positioned for supporting the weight of the energy transfer unit, the base being perpendicular to the limiting wall and coupled to the limiting wall such that the transformer is enclosed on at least two sides by the platform.*

*12. The wind power installation according to claim 9, further including a plurality of circuit breakers coupled between the energy transfer unit and the overland power lines, the circuit breakers providing an electrical connection between the energy transfer unit and the overland power lines.*

*13. The wind power installation according to claim 12 wherein said circuit breakers are positioned above the energy transfer unit.*

*14. The wind power installation according to claim 9, further including an electrical power line extending from the generator along the pylon to the platform, the electrical power line terminating at the energy transfer unit at a height approximately equal to the height of the overland power lines attached to the platform.*

*15. The wind power installation according to claim 9, further including a plurality of rotor blades coupled to the generator, the rotor blades being exposed to a wind for causing rotation of a portion of the generator by wind power.*

* * * * *